(12) United States Patent
Cook (10) Patent No.: US 11,401,112 B2
(45) Date of Patent: Aug. 2, 2022

(54) QUICK RELEASE DRAPER BELT TENSIONING SYSTEM

(71) Applicant: CNH Industrial America LLC, New Holland, PA (US)

(72) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 418 days.

(21) Appl. No.: 16/701,391

(22) Filed: Dec. 3, 2019

(65) Prior Publication Data

US 2021/0163229 A1 Jun. 3, 2021

(51) Int. Cl.
| | |
|---|---|
| *B65G 23/44* | (2006.01) |
| *A01D 41/14* | (2006.01) |
| *A01D 57/20* | (2006.01) |
| *B65G 15/60* | (2006.01) |
| *B65G 39/16* | (2006.01) |
| *A01D 43/06* | (2006.01) |

(52) U.S. Cl.
CPC ........... *B65G 23/44* (2013.01); *A01D 41/148* (2013.01); *A01D 43/06* (2013.01); *A01D 57/20* (2013.01); *B65G 15/60* (2013.01); *B65G 39/16* (2013.01); *B65G 2201/0202* (2013.01)

(58) Field of Classification Search
CPC ........ B65G 23/44; B65G 15/60; B65G 39/16; B65G 2201/0202; A01D 41/148; A01D 43/06; A01D 57/20; A01D 41/14; A01D 61/02
See application file for complete search history.

(56) References Cited

U.S. PATENT DOCUMENTS

| | | | | |
|---|---|---|---|---|
| 3,921,793 A * | 11/1975 | Hutchinson | ............ | B65G 23/44 198/816 |
| 4,007,827 A * | 2/1977 | Mattos | ................... | B65G 15/28 198/813 |
| 4,803,804 A * | 2/1989 | Bryant | ................. | F16H 7/1263 198/813 |
| 5,231,826 A * | 8/1993 | Jennings | ................ | A01D 57/20 56/11.4 |
| 6,206,397 B1 * | 3/2001 | Klassen | ............... | B62K 25/286 280/284 |

(Continued)

FOREIGN PATENT DOCUMENTS

DE 10361427 A1 8/2005

*Primary Examiner* — Mark A Deuble (74) *Attorney, Agent, or Firm* — Peter Zacharias; Patrick Sheldrake (57) ABSTRACT

A draper belt tensioning system having a frame, roller, control link, and tension link. The roller is movable relative to the frame. The control link has a proximal end pivotally attached to the frame, and a distal end that is remote from the proximal end. The tension link has a proximal end connected to the roller and a distal end connected to the control link at a connection location offset from a control link pivot axis. The control link is movable between a locked position in which the connection location is on a first side of the roller rotation axis and the control link pivot axis, a centered position, and an unlocked position in which the connection location is on another side of the roller rotation axis and the control link pivot axis. The control link has a greater angle in the locked position than in the unlocked position.

22 Claims, 5 Drawing Sheets

(56) References Cited

U.S. PATENT DOCUMENTS

| | | | | |
|---|---|---|---|---|
| 7,549,531 | B2* | 6/2009 | Hosch | B65G 23/44 |
| | | | | 198/813 |
| 7,921,627 | B2* | 4/2011 | Sauerwein | A01D 34/13 |
| | | | | 56/304 |
| 8,544,250 | B2 | 10/2013 | Lovett et al. | |
| 8,573,388 | B2* | 11/2013 | Hoffman | B65G 23/44 |
| | | | | 198/816 |
| 11,021,329 | B2* | 6/2021 | Howard | B65G 23/44 |
| 2015/0007545 | A1* | 1/2015 | Honas | A01D 41/142 |
| | | | | 56/181 |
| 2016/0360699 | A1 | 12/2016 | Allochis | |
| 2021/0147152 | A1* | 5/2021 | Cook | A01D 41/12 |

* cited by examiner

QUICK RELEASE DRAPER BELT TENSIONING SYSTEM

BACKGROUND OF THE INVENTION

Agricultural equipment, such as combines, swathers and windrowers, typically include a header that is movably attached to the chassis of the vehicle. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

A header typically includes conveyors to move crop materials from the lateral ends of the header towards the center of the header, and from the center of the header back towards the combine's threshing and separating system. In some cases, these conveyors comprise draper belts that are supported on rollers or the like. Draper belts typically require occasional replacement, as well as periodic maintenance to adjust tension and tracking. It is also sometimes necessary to remove crop material that become trapped between the inner surface of the belt and the support rollers. To facilitate such service, the draper belt might be mounted on one or more movable belt tensioning rollers. For example, a tensioning roller might be located at one end of the belt, and be mounted such that it is movable towards and away from an opposite roller to increase and decrease tension. The tensioning roller is attached to the header frame by one or more compression or tension springs, which are deformed to generate tension in the belt. In some cases, the spring compression is adjusted by rotating mounting screws that hold the springs to the frame.

Such maintenance can be time-consuming, and relatively difficult to accomplish. For example, it might be necessary to move a tensioning roller mounted on M16 bolts up to two inches or more to remove the belt, thus requiring as many as 25 complete turns of each mounting bolt. Such procedure can become even more difficult when the belt maintenance is performed in the field to open the belts to remove accumulated crop materials.

Thus, the state of the art still requires development.

This description of the background is provided to assist with an understanding of the following explanations of exemplary embodiments, and is not an admission that any or all of this background information is necessarily prior art.

SUMMARY OF THE INVENTION

In one exemplary aspect, there is provided a draper belt tensioning system having a frame, a roller, a control link, and a tension link. The roller extends along a roller rotation axis from a first roller end to a second roller end, and is movable relative to the frame along a lateral direction that is perpendicular to the roller rotation axis. The control link has a proximal control link end pivotally attached to the frame at a control link pivot axis that is offset from the roller rotation axis, and a distal control link end that is remote from the proximal control link end. The tension link has a proximal tension link end connected to the roller and a distal tension link end connected to the control link at a connection location offset from the control link pivot axis. The control link is movable about the control link pivot axis between a locked position, a centered position, and an unlocked position. In the locked position, the roller rotation axis, the control link pivot axis, and the connection location are oriented, as viewed in a plane orthogonal to the control link pivot axis, with the roller rotation axis being angularly offset from the connection location relative to the control link pivot axis at a first angle that is less than 180 degrees, and the connection location being on a first side of a line intersecting the roller rotation axis and the control link pivot axis. In the centered position, the roller rotation axis, the control link pivot axis, and the connection location are arranged along a single straight line, as viewed in a plane orthogonal to the control link pivot axis. In the unlocked position, the roller rotation axis, the control link pivot axis, and the connection location define a triangle, as viewed in a plane orthogonal to the control link pivot axis, with the roller rotation axis being angularly offset from the connection location relative to the control link pivot axis at a second angle having a magnitude less than the first angle, and the connection location being on a second side of the line intersecting the roller rotation axis and the control link pivot axis.

In some exemplary embodiments, the tension link includes a first tension link arm connected to the first roller end, and a second tension link arm connected to the second roller end.

In some exemplary embodiments, the control link includes a first control arm and a second control arm, and the first tension link arm is connected to the first control arm at a first connection location and the second tension link arm is connected to the second control arm at a second connection location.

In some exemplary embodiments, the control link includes a control bar connecting the first control arm to the second control arm.

In some exemplary embodiments, the connection location includes a slider that is movable along the control link between a first position in which the connection location is relatively close to the control link pivot axis, and a second position in which the connection location is relatively far from the control link pivot axis, and the draper belt tensioning system further comprises a spring mounted on the control link between the slider and the control link pivot axis. The spring may have an adjustable preload. The adjustable preload may include a collar movably mounted to the control link between the slider and the control link pivot axis. The collar may be movably mounted between the spring and the control link pivot axis, and may include internal threads configured to engage corresponding external threads on the control link.

In some exemplary embodiments, the tension link includes a spring located between the proximal tension link end and the distal tension link end. The tension link may have an adjustable length. The tension link may have a turnbuckle.

In another exemplary aspect, there is provided a draper belt and draper belt tensioning system having a frame, a draper belt, a roller, a control link, and a tension link. The roller is located within the draper belt and extends along a roller rotation axis from a first roller end to a second roller end. The roller is movable relative to the frame along a lateral direction that is perpendicular to the roller rotation axis. The control link includes a first control arm pivotally connected to the frame to rotate about a control link axis, a second control arm pivotally connected to the frame to rotate about the control link axis, and a control bar connecting the first control arm to the second control arm. The tension link connects the control link to the roller, and includes a first tension link extending from the first roller end to the first control arm at a first connection location offset from the control link pivot axis, and a second tension link extending from the second roller end to the second control arm at a second connection location offset from the control link pivot axis. The control link is movable about the control link pivot axis between a locked position, a centered position, and an unlocked position. In the locked position, the first connection location and the second connection location are located on a first side of an axis extending from the roller rotation axis to the control link pivot axis, the roller is located a first distance from the control link pivot axis, and a first tension force is generated in the belt. In the centered position, the first connection location and the second connection location are located along the axis extending from the roller rotation axis to the control link pivot axis and the roller is located a second distance from the control link pivot axis, the second distance being equal to or less than the first distance. In the unlocked position, the first connection location and the second connection location are located on a second side of the axis extending from the roller rotation axis to the control link pivot axis, and the roller is located a third distance from the control link pivot axis, the third distance being greater than the first distance and the second distance, and no tension force or a second tension force is generated in the belt, the second tension force being less than the first tension force.

In some exemplary embodiments, the first connection location includes a first slider on the first control arm, and the second connection location includes a second slider on the second control arm, and the draper belt and draper belt tensioning system further includes a first spring mounted on the first control arm between the first slider and the control link pivot axis, and a second spring mounted on the second control arm between the second slider and the control link pivot axis. The first spring and the second spring may be deformed to generate the first tension force when the control link is in the locked position. The first spring and optionally the second spring may have an adjustable preload. The first tension force may have a first magnitude at the first roller end, and a second magnitude at the second roller end, and the adjustable preload may be configured to vary a proportional value of the first magnitude and the second magnitude. The adjustable preload may include a collar movably mounted to the first control arm between the first slider and the control link pivot axis.

In some exemplary embodiments, the first tension link includes a first spring located between the first roller end and the first connection location, and the second tension link includes a second spring located between the second roller end and the second connection location. The first tension link and optionally the second tension link may have an adjustable length.

In another exemplary aspect, there is provided an agricultural combine having a chassis configured for movement across a surface, a threshing and separating system mounted on the chassis, and a header attached to the chassis and operatively connected to the threshing and separating system by a feeder housing. The header may include a draper belt and draper belt tensioning system as described in the previous exemplary aspects.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide quick release draper belt systems for use on headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
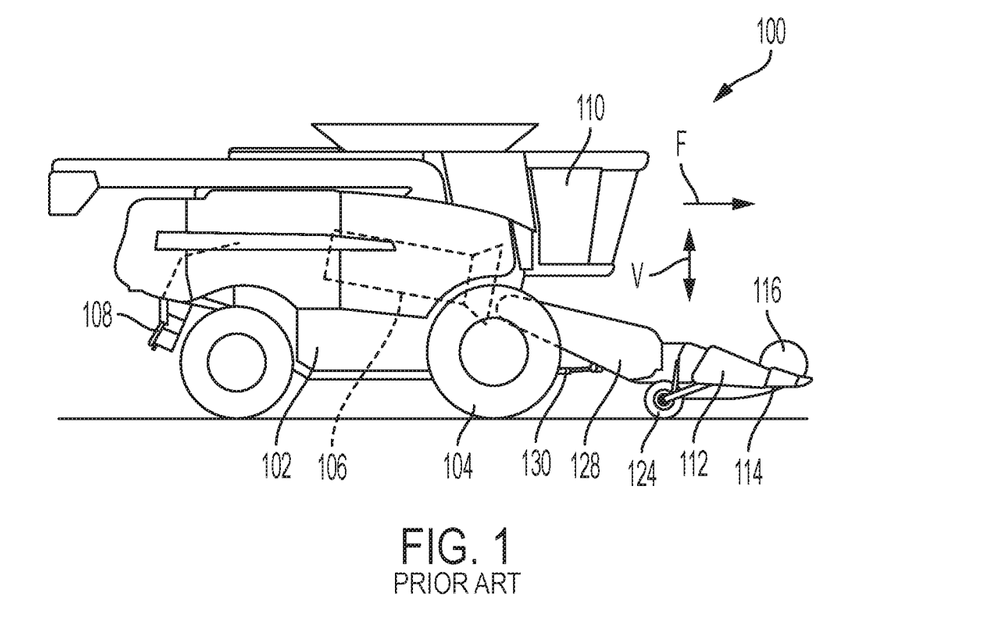
FIG. 1 is a side view of a prior art agricultural combine.

FIG. 1 illustrates an example of a prior art agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
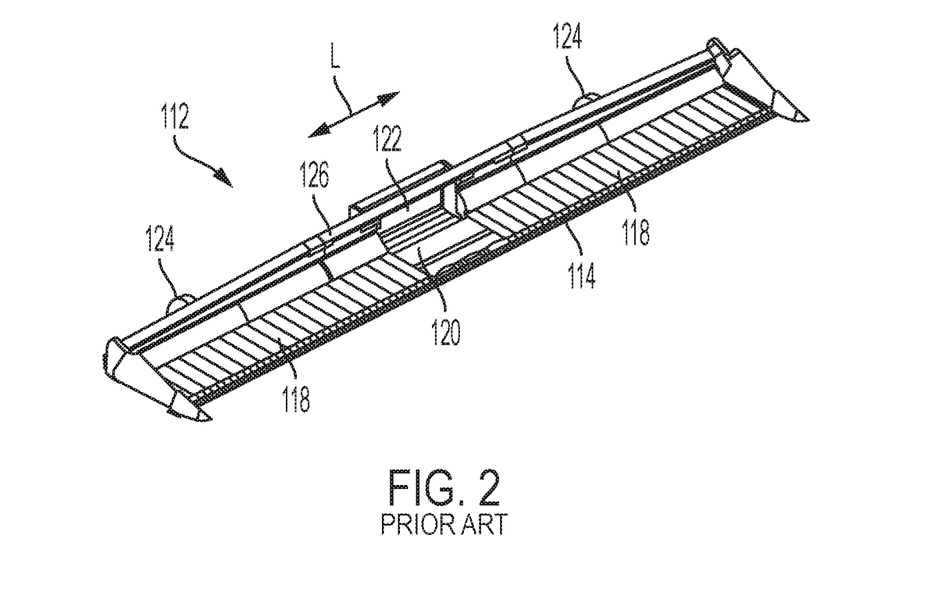
FIG. 2 is an isometric view of a prior art header.

Referring also to FIG. 2, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also includes crop conveyors 118 that are configured to move the crop material at the lateral ends of the header 112 towards the center of the header 112. The crop conveyors 118 may be in the form of draper belts, auger screws, or the like. At the center, the header 112 may include a feeder conveyor 120 that conveys the crop material backwards towards a crop outlet 122. The feeder conveyor 120 may comprise a draper belt, a feeder drum, one or more augers, or the like. The header 112 also may include gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more feeder housing actuators 130 to raise and lower the header 112 in a vertical direction V relative to the ground.

The illustrated exemplary header 112 is a unitary header having a single frame that extends continuously between the ends of the header 112 in the lateral direction L. In other embodiments, the header 112 may comprise a multi-segment or articulated header having a center section and one of more wing sections movably attached to the lateral end of the center section by pivots or linkages. In either case, the header 112 has a central region defined by the lateral extent of the crop outlet, and lateral regions extending in the lateral direction L from the central region.

In use, the header 112 cuts crop materials with the cutter bar 118, receives the crop materials on the conveyors 118, 120, and conveys the crop materials back through the crop outlet 122 to the threshing and separating system 106. One or both of the conveyors 118, 120 may comprise a draper belt system having a segmented or continuous belt supported on rollers. At least two of the rollers are configured to apply some degree of tension to the belt, to ensure that the belt does not slip on the drive roller. Maintenance on the belt is performed by releasing the tension, such as by canceling the force of a biasing spring and/or moving the rollers towards each other. Mechanisms for releasing and reapplying belt tension are described in more detail in relation to the following exemplary embodiments.

Figure 3A:
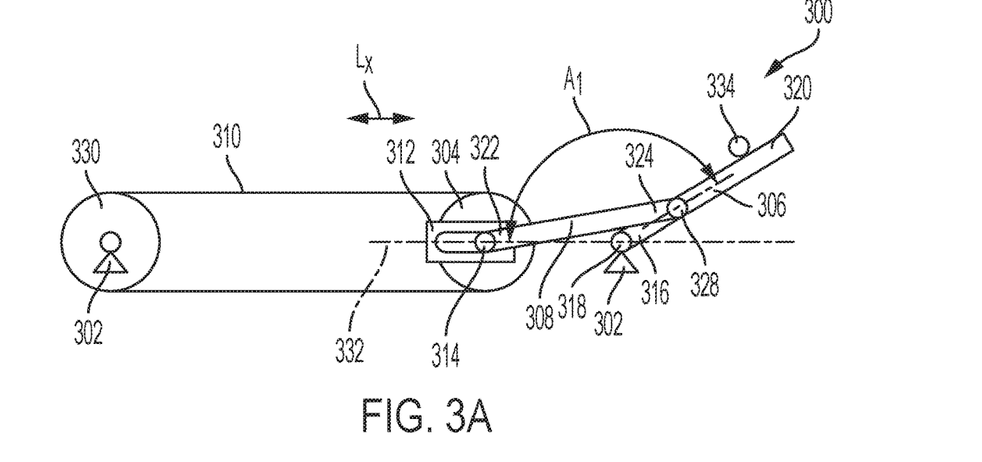
FIGS. 3A-3C are schematic side views of a first example of a draper belt tensioning system, shown in the locked, centered and unlocked positions, respectively.
Figure 3B:
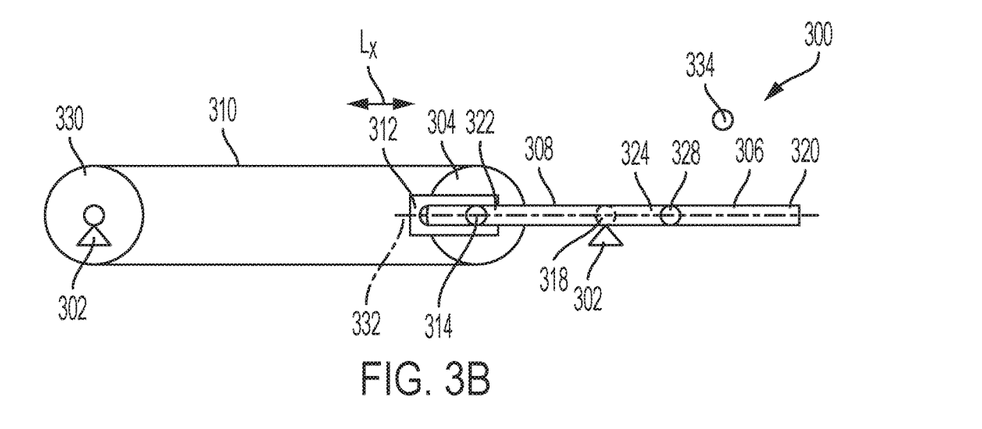
Figure 3C:
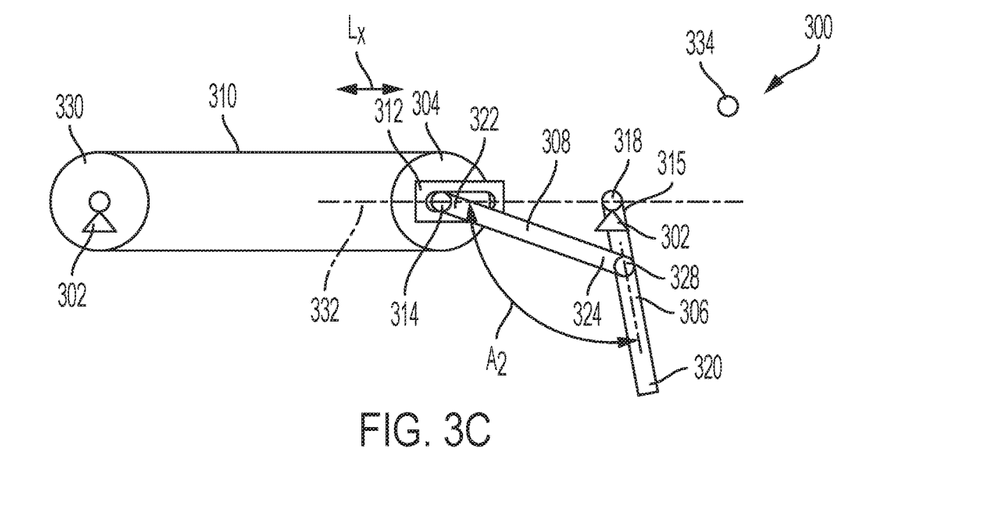

Referring to FIGS. 3A-3C, a first exemplary embodiment of a quick release draper belt tensioning system 300 is shown. The system 300 is mounted to the header's frame 302, and includes a roller 304, a control link 306, and a tension link 308. The frame may be any structural part of a header assembly, such as the frame of a unitary header, or the frame portions of a wing section or center section of a multi-segment header. The roller 304 is located inside the closed loop of a belt 310, and extends from a first end at one lateral side of the belt 310, to a second end at the other lateral side of the belt 310. The roller 304 is movably mounted to the frame, such as by being mounted by bearings or sliders at each end in a slotted support track 312. Alternatively, the track 312 may be omitted and the roller 304 may be suspended by its connections to the tension links 308. In either case, the roller 304 is movable relative to the frame 302 along a lateral direction Lx, which is perpendicular to the rotation axis 314 of the roller 304. In the shown example, the belt 310 is a lateral draper belt such as belt 118 in FIG. 2, and the lateral direction Lx is the same as the header's lateral direction L. In other cases, the belt 310 may be a center draper belt such as belt 120 in FIG. 2, in which case the lateral direction Lx in FIGS. 3A-3C would be generally perpendicular to the header's lateral direction L as shown in FIG. 2.

The control link 306 has a proximal control link end 316 pivotally attached to the frame 302 at a control link pivot axis 318, and a distal control link end 320 that is remote from the proximal control link end 316. The control link pivot axis 318 is offset from the roller rotation axis 314, preferably along the lateral direction Lx. The tension link 308 extends from a proximal tension link end 322 that is connected to the end of the roller 304, to a distal tension link end 324 that is connected to the control link 306 at a connection location 328. The connection location 328 is offset from the control link pivot axis 318.

As shown in FIGS. 3A-3C, the control link 306 is movable about the control link pivot axis 318. In FIG. 3A, the control link 306 is in a locked position, in which the belt 310 is held in tension between the movable roller 304 and a second roller 330 located at the other end of the belt loop. The second roller 330 may be fixed to the frame 302, or it may be movably mounted to the frame 302. The second roller also may comprise a drive roller that is powered by an electric or hydraulic motor or the like to move the belt 310. In the locked position, the roller rotation axis 314, the control link pivot axis 318, and the connection location 328 are oriented, as viewed in a plane orthogonal to the control link pivot axis 318 (i.e., as shown in FIGS. 3A-3C), with the roller rotation axis 314 being angularly offset from the connection location 328 relative to the control link pivot axis 318 at a first angle $A_1$ that is less than 180 degrees. Furthermore, the connection location 328 is located on a first side of a line 332 intersecting the roller rotation axis 314 and the control link pivot axis 318.

In FIG. 3B, the control link 306 is in a centered position, in which the roller rotation axis 314, the control link pivot axis 318, and the connection location 328 are arranged along a single straight line 332, as viewed in a plane orthogonal to the control link pivot axis. In the centered position, the roller 304 is moved further from the second roller 330, as compared to the locked position.

In FIG. 3C, the control link 306 is in an unlocked position in which the roller rotation axis 314, the control link pivot axis 314, and the connection location 328 define a triangle, as viewed in a plane orthogonal to the control link pivot axis 318, with the roller rotation axis 314 being angularly offset from the connection location 328 relative to the control link pivot axis 318 at a second angle $A_2$ having a magnitude that is less than the first angle $A_1$. Furthermore, the connection location 328 is located on a second side of the line 332 intersecting the roller rotation axis 314 and the control link pivot axis 318. Thus, the roller 304 is closer to the second roller 330 when the control link 306 is in the unlocked position, than it is when the control link 306 is in the locked position or the centered position.

In the example of FIGS. 3A-3C, the control link 306 and tension link 308 act as an over-center toggle linkage that prevents the control link 306 from moving from the locked position to the unlocked position without first overcoming a force necessary to move the control link 306 from the locked position and through the centered position. This motion is resisted by tension in the belt 310. In this case, movement of the roller 304 as it is pulled by the tension link 308 stretches the belt 310, and such stretching generates a restoring force that pulls the movable roller 304 towards the second roller 330. The amount of tension may be adjusted, for example, by adjusting the length of the tension link 308, or moving the location of the connection location 328 closer to or further from the control link pivot axis 318 to reduce or increase tension, respectively. When the control link 306 is in the locked position, the restoring force generated by the belt 310 tends to pull the control link 306 beyond the locked position, and so a travel stop 334 may be provided on the frame or on surrounding structures to prevent the control link 306 from moving past the locked position.

When it is desired to release tension on the belt 310, the operator pushes down on the control link 306. Such movement requires the belt 310 to be stretched more than it is in the locked position, and so the belt's internal tension resists movement from the locked position to the centered position. However, once the operator applies sufficient force on the control link 306 to move the control link 306 beyond the centered position, the belt's internal tension will pull the control link 306 towards the unlocked position.

When the control link 306 reaches the unlocked position, the belt tension is reduced to a magnitude that is less than in the centered and locked positions, and the tension may be reduced to zero (i.e., the belt 310 may be slack). This reduction or removable of tension allows the operator to perform maintenance on the belt 310. For example, when the belt is slack, the operator can easily remove and replace the belt 310, or perform other services such as clearing debris from inside the belt 310. Moving the control link 306 to the unlocked positon can also make it easier to perform adjustments on the belt tension, as explained in more detail below.

The embodiment of FIGS. 3A-3C may be configured to simultaneously or separately move both ends of the roller 304 to generate tension in the belt 310. For example, the tension link 308 may have a first arm that connects to one end of the roller 304, and a second arm that connects to the other end of the roller 304, and the two arms may join to a single control link 306 to allow simultaneous movement of both ends of the roller 304. Alternatively, as separate tension link 308 and control link 306 may be provided for each end of the roller 304 to allow separate operation of both. As still another example, the tension link 308 and control link 306 may both include individual respective arms at each end of the roller, and the control link arms may be connected by a crossbar to allow the two control link arms to be operated simultaneously, such as discussed in relation to FIGS. 4A-4D.

Another exemplary embodiment is illustrated in FIGS. 4A-4D. In this case, the quick release draper belt tensioning system 400 includes a control link having a first control link arm 402 and a second control link arm 402', a tension link having a first tension link arm 404 and a second tension link arm 404', and a roller 406.

The first tension link arm 404 is connected at its proximal end to a first end 408 of the roller 406, and the second tension link arm 404' is connected at its proximal end to a second end 408' of the roller 406. The tension link arms 404, 404' may be rotatably connected to the roller 406 by bearings, bushings, or the like, or they may be rigidly attached to an axle or other structure upon which the roller 406 is rotatably mounted. The roller 406 itself is rotatable about a roller rotation axis 410, and located within the loop of a belt 412.

The first and second control link arms 402, 402' are both connected to the header frame (not shown) to rotate about a control link rotation axis 414. For example, each control link arm 402, 402' may have a respective pivot 416, 416' that fits into a respective bearing or bushing on the frame. The control link rotation axes 414 of the control link arms 402, 402' preferably are collinear, such as shown, but this is not strictly required. The first and second control link arms 402, 402' are joined to one another by a control bar 418, which provides a handle for use by an operator to simultaneously move both control link arms 402, 402'.

The first tension link arm 404 is connected at its distal end to a first connection location 420 on the first control arm 402, and the second tension link arm 404' is connected at its distal end to a second connection location 420' on the second control arm 402'. In each case, the connection location 420, 420' is offset from the control link rotation axis 414. Thus, movement of the control link arms 402, 402' about the control link pivot axis 414 causes the tension links 404, 404' to displace the roller 406 relative to the frame.

Figure 4A:
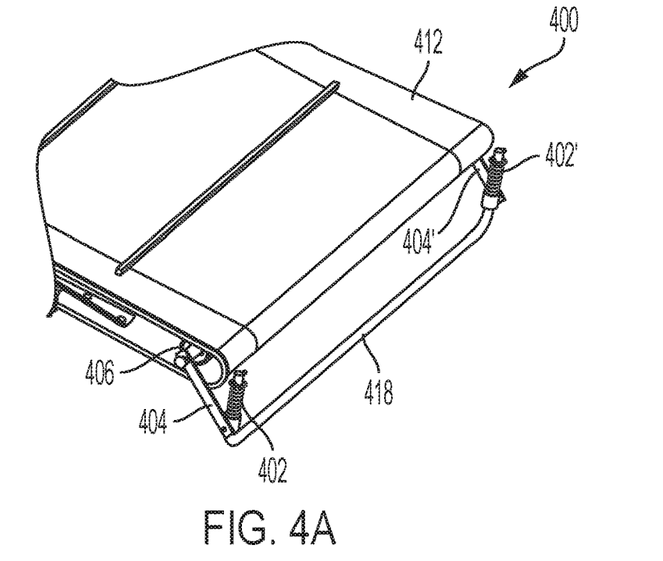
FIG. 4A is an isometric view of another example of a draper belt tensioning system.
Figures 4B, 4C:
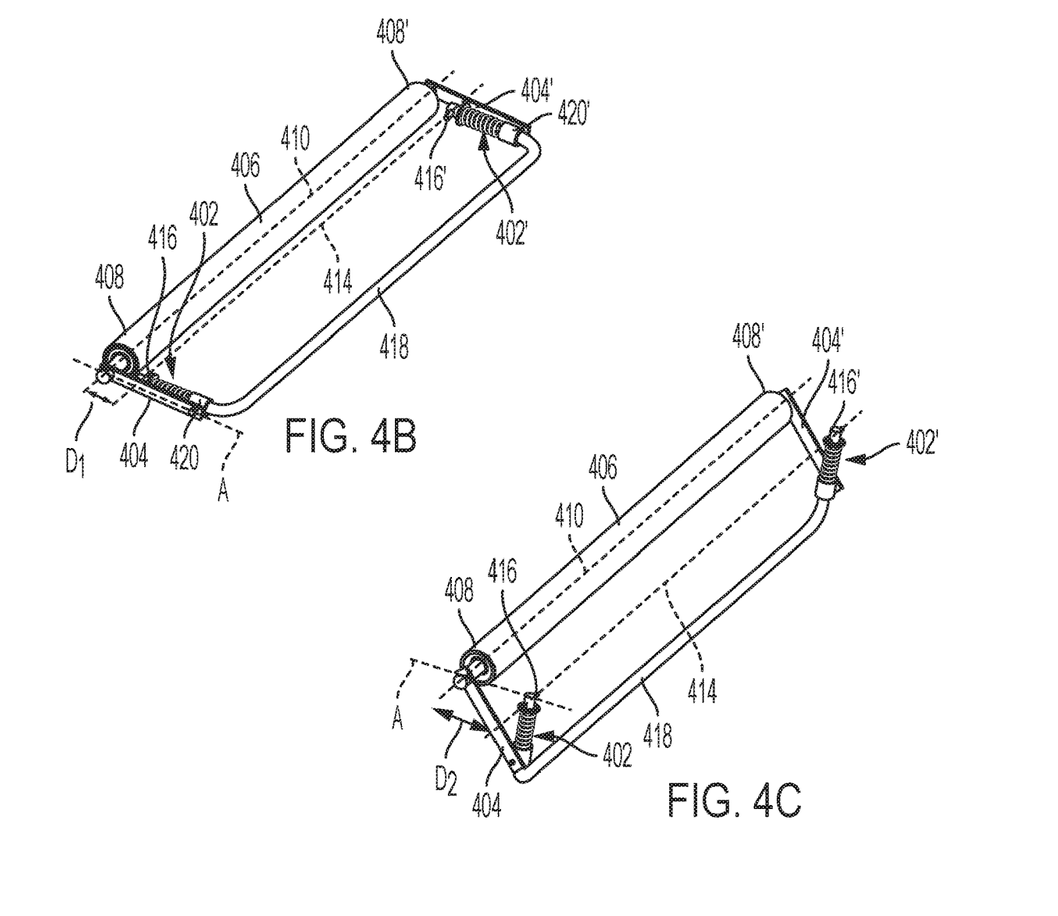
FIGS. 4B and 4C are isometric views of the draper belt tensioning system of FIG. 4A, shown in the locked and unlocked positions, respectively.
Figure 4D:
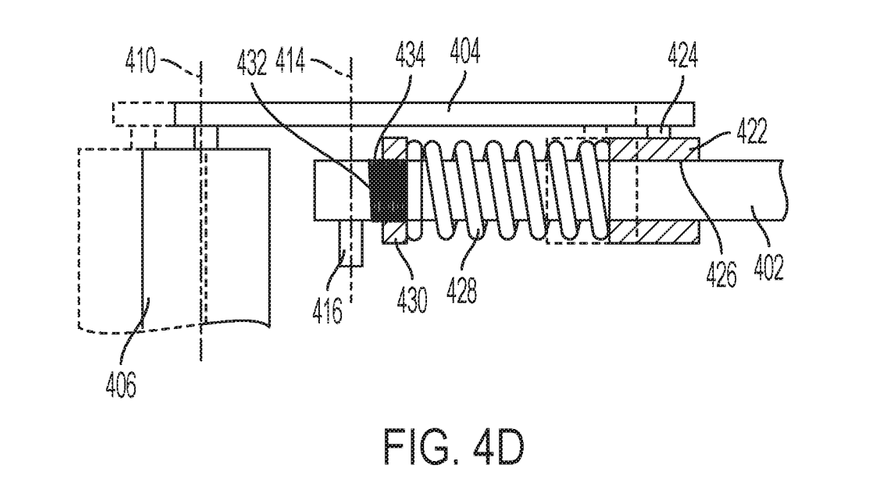
FIG. 4D illustrates details of the draper belt tensioning system of FIGS. 4A-4C.

In addition, each connection location 420, 420' may be configured as a slider that is movable along the respective control link arm 402, 402' between a first position in which the connection location 420, 420' is relatively close to the control link pivot axis 414 (shown in dashed lines in FIG. 4D), and a second position in which the connection location 420, 420' is relatively far from the control link pivot axis 414 (shown in solid lines in FIG. 4D). For example, as shown in FIG. 4D, each connection location 420, 420' may comprise a slider 422 having a pivot connection 424 to the respective tension link arm 404, and a bore 426 that fits around the outer surface of the respective control link arm.

First and second springs 428, 428' are located on each control link arm 402, 402' between the respective connection location 420, 420' and the control link pivot axis 414.

In operation, the control link arms 402, 402' are movable by applying a force to the control bar 418. Specifically, the control link arms 402, 402' are movable between a locked position, as shown in FIG. 4B, a centered position (not illustrated but comparable to the configuration shown in FIG. 3B), and an unlocked position, as shown in FIG. 4C.

In the locked position, the first and second connection locations 420, 420' are located on a first side of an axis A extending from the roller rotation axis 410 to the control link pivot axis 414. In this position, the springs 428, 428' are compressed to exert a resilient biasing force to hold the roller 406 a first distance $D_1$ from the control link pivot axis 414, and to generate a first tension force on the belt 412. A travel stop (not shown) may be provided to prevent the control link arms 402, 402' from moving past the locked position.

In the centered position (see, e.g., FIG. 3B), the first and second connection locations 420, 420' are located along the axis A extending from the roller rotation axis 410 to the control link pivot axis 414. In this position, the springs 428, 428' are compressed to exert a resilient biasing force to pull the roller 406 towards the control link pivot axis 414. This force also generates a tension force in the belt 412, which may cause the roller 406 to move closer to the control link pivot axis 414 (as compared to the locked position). Travel stops (not shown) may be provided to prevent the control link arms 402, 402' from moving beyond locked or unlocked positions.

In the unlocked position, the first and second connection locations 420, 420' are located on a second side of the axis A extending from the roller rotation axis 410 to the control link pivot axis 414. In this position, roller 406 is located a second distance $D_2$ from the control link pivot axis 414, with the second distance $D_2$ being greater than the first distance $D_1$. In this position, the springs 428, 428' are either uncompressed (or not compressed any greater than a static preload compression value that is independent of the linkage configuration), so that no tension force is generated in the belt 412. Alternatively, the springs 428, 428' may be compressed such that they generate a lower magnitude of tension in the belt 412 as compared to the tension generated when the linkage is in the locked position. A travel stop (not shown) may be provided to prevent the control link arms 402, 402' from moving past the unlocked position.

In this example, the springs 428, 428' provide an over-center locking mechanism that prevents the control link arms 402, 402' from being moved from the locked position to the unlocked position without applying a force to move them past the centered position. More specifically, the springs 428, 428' are mounted to rotate with the control link arms 402, 402', so the compression distance of the springs 428, 428' (and thus the magnitude of their restoring forces) is a function of the angular position of the control link arms 402, 402'. In the locked position, the springs 428, 428' are angled relative to the reaction force generated in the tension link arms 404, 404', whereas in the centered position the springs 428, 428' are aligned with the reaction force in the tension link arms 404, 404'. Thus, a force must be applied to move the control link arms 402, 402' from the locked position to the centered position. Once the centered position is reached, the springs 428, 428' operate to pull the control link arms 402, 402' to the unlocked position.

In the shown example, the linkage is configured such that a downward force is applied to the control bar 418 to move the linkage from the locked position to the unlocked position. In this configuration, the control bar 418 may be configured with a step or a surface that is accessible to an operator's foot, to allow the operator to step on the control bar 418 to move the linkage to the unlocked position. However, the opposite arrangement may be used instead. Furthermore, additional linkages may be provided to convert the up and down motion of the control link arms 402, 402' into lateral or rotary motion to allow control by other mechanisms (e.g., a push bar that moves in the horizontal direction). In addition, control mechanisms (e.g., pneumatic or hydraulic actuators) may be provided to allow powered or remote control of this belt tensioning system 400, or other embodiments of belt tensioning systems.

The foregoing example is expected to provide rapid and simple tensioning and releasing of the draper belt 412 using a single control input (i.e., the control bar 418). This embodiment also may allow the operator to rapidly adjust belt tension to increase or decrease the overall belt tension, or to alter the proportion of tension at the two ends of the roller 406 to correct tracking issues. Such adjustments may be provided by configuring one or both springs 428, 428' with an adjustable preload. In the shown example, an adjustable preload is provided by a collar 430 that is movably mounted on the control link arm 402. The degree of preload is changed by moving the collar 430 towards or away from the slider 422, to thereby increase or decrease preload on the spring 428. In this example, the collar 430 is movably mounted on the control link arm 402 by internal threads 432 that mate with external threads 434 on the outer surface of the control link arm 402.

Other embodiments may use different preload adjustment mechanisms. For example, the collar 430 may be fixed in place on the control link arm 402, and a separate movable collar may be located between the slider 422 and the spring 428. Alternatively, the linkage may not have movable collars, but instead be provided with shims or a wedge to place between the collar 430 or the slider 422 and the spring 428 to increase spring preload. As another example, the mechanical spring shown in FIGS. 4A-4D may be replaced by a pneumatic spring, such as a compressed air cylinder, which may be pressurized or depressurized to provide the desired preload. Other alternatives and variations will be apparent to persons of ordinary skill in the art in view of the present disclosure.

In use, the operator can adjust the tension on one or both ends of the belt 412 by modifying the adjustable preload. In some cases, this may be accomplished while the belt tensioning system 400 is in the locked position, but doing so would be predicated on the operator having sufficient access to the adjustable preload and may require the use of tools to overcome the pressure applied against the adjustment mechanism. More preferably, the adjustable preload may be operated when the belt tensioning system 400 is in the unlocked position, in which case adjustments might, in some cases, be possible by hand without using any tools. In any event, the adjustable preload may be configured to allow an operator to adjust total belt tension by adjusting the preload at both ends of the roller 406, or to vary the proportional magnitude of belt tension at the first roller end 408 and the second roller end 408' by making selective adjustments to one or both adjustable preloads.

Figure 5:
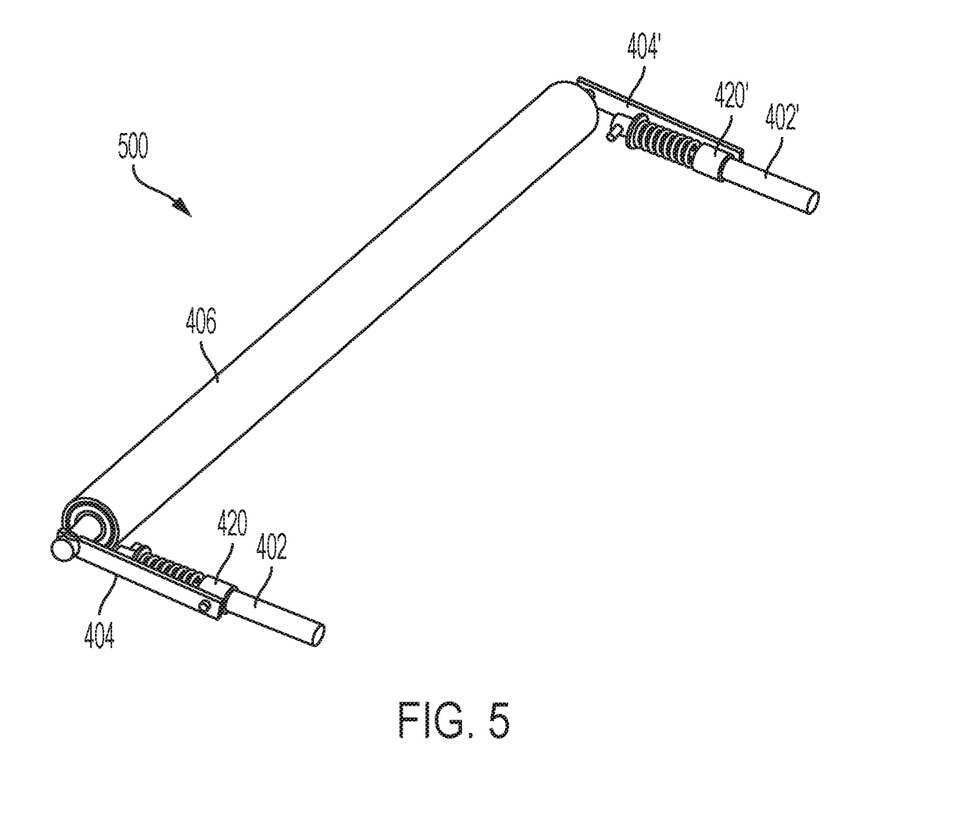
FIG. 5 is an isometric view of another example of a draper belt tensioning system.

Referring now to FIG. 5, it is also envisioned that embodiments may have completely separate controls for the two ends of the roller. In this case, the belt tensioning system 500 is the same as the belt tensioning system 400 in FIGS. 4A-4D, but the control bar 418 is removed to allow separate articulation of the first control link arm 402 and second control link arm 402 and their respective associated tension links 404, 404'.

Figure 6A:
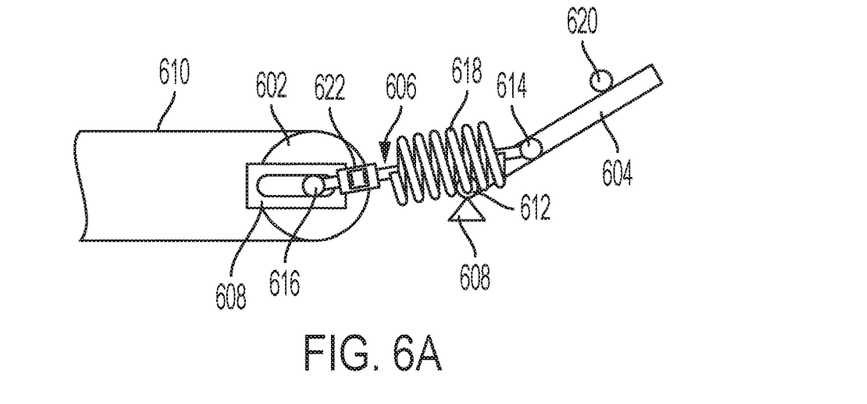
FIGS. 6A-6C are schematic views of another draper belt tensioning system, shown in the locked, centered and unlocked positions, respectively.
Figure 6B:
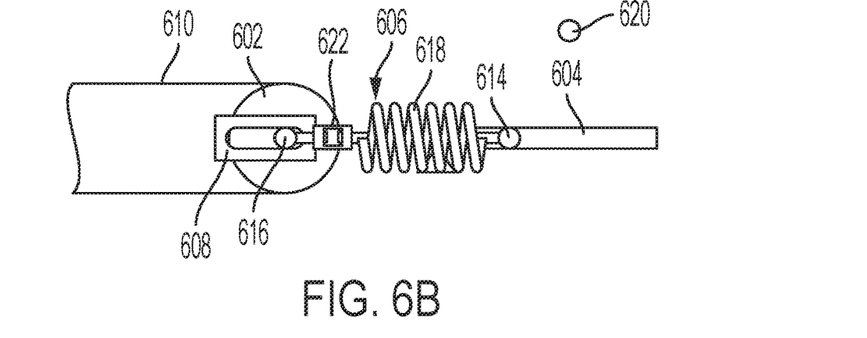
Figure 6C:
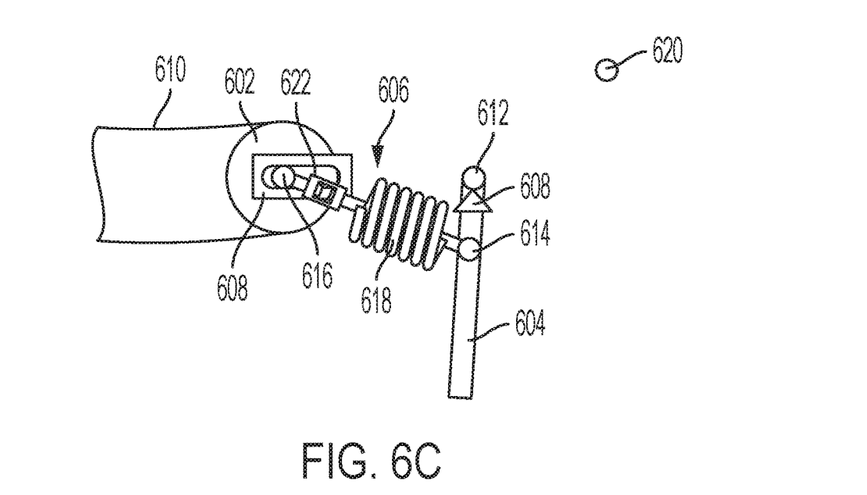

Another embodiment of a belt tensioning system 600 is illustrated in FIGS. 6A-6C. Here, the system 600 again includes a roller 602, a control link 604 and a tension link 606. The roller 602 is movable relative to the header frame 608, and is positioned within the loop of a belt 610. The control link 604 is rotatably mounted to the frame 608 at a control link pivot axis 612. The tension link 606 is connected between the roller 602 and a connection location 614 on the control link 604. The connection location 614 is offset from the control link pivot axis 612, such that the connection location 614 moves towards and away from the roller's rotation axis 616 as the control link 604 moves about the control link pivot axis 612.

In this example, the tension link 606 has a variable length, and a spring 618 that generates a restoring force to decrease the length of the tension link 606. For example, the spring 618 may be a coil spring mounted in tension between the proximal and distal ends of the tension link 606, which provides both extendibility and the desired restoring force. Alternatively, the spring 618 may comprise a compression spring mounted between overlapping ends of two segments of the tension link 606, an elastomeric spring, a pneumatic spring, or the like.

In operation, the control link 604 is movable from a locked position as shown in FIG. 6A, to a centered position as shown in FIG. 6B, and to an unlocked position as shown in FIG. 6C. A travel stop 620 maybe provided to prevent travel beyond the locked position. A similar travel stop (not shown) may also be provided to prevent motion beyond the unlocked position.

In the locked position, the connection location 614 is located on one side of a line defined between the roller rotation axis 616 and the control link pivot axis 612, and the spring 618 generates a restoring force to apply tension to the belt 610 and to hold the control link 604 against the travel stop 620. In the centered position, the connection location 614 is aligned with the roller rotation axis 616 and the control link pivot axis 612, and the spring 618 exerts a greater restoring force than in the locked position. Thus, an operator must apply a force to move the control link 604 from the locked position to the centered position. In the unlocked position, the connection location 614 is located on the other side of the line defined between the roller rotation axis 616 and the control link pivot axis 614, and the control link 604 is rotated far enough to reduce the tension on the belt and the restoring force in the spring 618 to a magnitude that allows servicing of the belt (e.g., no tension, or tension low enough to allow an operator to operate belt tensioners, remove the belt, or remove debris).

The tension link 606 also may include an adjustable preload to allow the operator to modify the belt tension or change the relative proportion of tension at each end of the roller 602. For example, the tension link 606 may include a turnbuckle 622 that receives oppositely-threaded portions of the tension link 606. Rotating the turnbuckle 622 changes the overall length of the tension link 606, which increases or decreases the amount of restoring force generated by the spring 618 when the control link 604 is in the locked position. The turnbuckle 622 or other adjustable preload preferably can be adjusted when the system 600 is in the locked or unlocked position, and preferably without tools in the unlocked position, but these are not strict requirements of all embodiments. Other alternatives and variations will be apparent to persons of ordinary skill in the art in view of the present disclosure.

Embodiments such as described herein may be used in any suitable combination or configuration in machinery having draper belts or similar conveyors. However, it is expected that embodiments will have particular utility in agricultural combines such as described in relation to FIGS. 1 and 2, to improve the serviceability of such equipment both in the shop and in the field.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A draper belt tensioning system comprising:
   a frame;
   a roller extending along a roller rotation axis from a first roller end to a second roller end, the roller being movable relative to the frame along a lateral direction that is perpendicular to the roller rotation axis;
   a control link having a proximal control link end pivotally attached to the frame at a control link pivot axis that is offset from the roller rotation axis, and a distal control link end that is remote from the proximal control link end; and
   a tension link having a proximal tension link end connected to the roller and a distal tension link end connected to the control link at a connection location offset from the control link pivot axis;
   wherein the control link is movable about the control link pivot axis between:
      a locked position, in which the roller rotation axis, the control link pivot axis, and the connection location are oriented, as viewed in a plane orthogonal to the control link pivot axis, with the roller rotation axis being angularly offset from the connection location relative to the control link pivot axis at a first angle that is less than 180 degrees, and the connection location being on a first side of a line intersecting the roller rotation axis and the control link pivot axis,
      a centered position, in which the roller rotation axis, the control link pivot axis, and the connection location are arranged along a single straight line, as viewed in a plane orthogonal to the control link pivot axis, and
      an unlocked position in which the roller rotation axis, the control link pivot axis, and the connection location define a triangle, as viewed in a plane orthogonal to the control link pivot axis, with the roller rotation axis being angularly offset from the connection location relative to the control link pivot axis at a second angle having a magnitude less than the first angle, and the connection location being on a second side of the line intersecting the roller rotation axis and the control link pivot axis.

2. The draper belt tensioning system of claim 1, wherein the tension link comprises a first tension link arm connected to the first roller end, and a second tension link arm connected to the second roller end.

3. The draper belt tensioning system of claim 2, wherein the control link comprises a first control arm and a second control arm, and the first tension link arm is connected to the first control arm at a first connection location and the second tension link arm is connected to the second control arm at a second connection location.

4. The draper belt tensioning system of claim 3, wherein the control link comprises a control bar connecting the first control arm to the second control arm.

5. The draper belt tensioning system of claim 1, wherein the connection location comprises a slider that is movable along the control link between a first position in which the connection location is relatively close to the control link pivot axis, and a second position in which the connection location is relatively far from the control link pivot axis, and wherein the draper belt tensioning system further comprises:
   a spring mounted on the control link between the slider and the control link pivot axis.

6. The draper belt tensioning system of claim 5, wherein the spring has an adjustable preload.

7. The draper belt tensioning system of claim 6, wherein the adjustable preload comprises a collar movably mounted to the control link between the slider and the control link pivot axis.

8. The draper belt tensioning system of claim 7, wherein the collar is movably mounted between the spring and the control link pivot axis, and comprises internal threads configured to engage corresponding external threads on the control link.

9. The draper belt tensioning system of claim 1, wherein the tension link comprises a spring located between the proximal tension link end and the distal tension link end.

10. The draper belt tensioning system of claim 9, wherein the tension link has an adjustable length.

11. The draper belt tensioning system of claim 10, wherein the tension link comprises a turnbuckle.

12. A draper belt and draper belt tensioning system comprising:
   a frame;
   a draper belt;
   a roller located within the draper belt and extending along a roller rotation axis from a first roller end to a second roller end, the roller being movable relative to the frame along a lateral direction that is perpendicular to the roller rotation axis;
   a control link comprising a first control arm pivotally connected to the frame to rotate about a control link axis, and a second control arm pivotally connected to the frame to rotate about the control link axis; and
   a tension link connecting the control link to the roller, the tension link comprising a first tension link extending from the first roller end to the first control arm at a first connection location offset from the control link pivot axis, and a second tension link extending from the second roller end to the second control arm at a second connection location offset from the control link pivot axis;

wherein the control link is movable about the control link pivot axis between:

a locked position, in which the first connection location and the second connection location are located on a first side of an axis extending from the roller rotation axis to the control link pivot axis, the roller is located a first distance from the control link pivot axis, and a first tension force is generated in the belt;

a centered position, in which the first connection location and the second connection location are located along the axis extending from the roller rotation axis to the control link pivot axis and the roller is located a second distance from the control link pivot axis, the second distance being equal to or less than the first distance, and an unlocked position in which the first connection location and the second connection location are located on a second side of the axis extending from the roller rotation axis to the control link pivot axis, and the roller is located a third distance from the control link pivot axis, the third distance being greater than the first distance and the second distance, and no tension force or a second tension force is generated in the belt, the second tension force being less than the first tension force.

13. The draper belt and draper belt tensioning system of claim 12, wherein the first connection location comprises a first slider on the first control arm, and the second connection location comprises a second slider on the second control arm, and wherein the draper belt and draper belt tensioning system further comprises:

a first spring mounted on the first control arm between the first slider and the control link pivot axis; and a second spring mounted on the second control arm between the second slider and the control link pivot axis.

14. The draper belt and draper belt tensioning system of claim 13, wherein:

the first spring and the second spring are deformed to generate the first tension force when the control link is in the locked position.

15. The draper belt and draper belt tensioning system of claim 14, wherein at least the first spring has an adjustable preload.

16. The draper belt and draper belt tensioning system of claim 15, wherein the first tension force has a first magnitude at the first roller end, and a second magnitude at the second roller end, and the adjustable preload is configured to vary a proportional value of the first magnitude and the second magnitude.

17. The draper belt and draper belt tensioning system of claim 15, wherein the adjustable preload comprises a collar movably mounted to the first control arm between the first slider and the control link pivot axis.

18. The draper belt and draper belt tensioning system of claim 12, wherein the first tension link comprises a first spring located between the first roller end and the first connection location, and the second tension link comprises a second spring located between the second roller end and the second connection location.

19. The draper belt and draper belt tensioning system of claim 18, wherein at least the first tension link has an adjustable length.

20. The draper belt and draper belt tensioning system of claim 18, further comprising a control bar connecting the first control arm to the second control arm.

21. An agricultural combine comprising:

a chassis configured for movement across a surface;

a threshing and separating system mounted on the chassis; and a header attached to the chassis and operatively connected to the threshing and separating system by a feeder housing, the header including:

a frame;

a draper belt;

a roller located within the draper belt and extending along a roller rotation axis from a first roller end to a second roller end, the roller being movable relative to the frame along a lateral direction that is perpendicular to the roller rotation axis;

a control link comprising a first control arm pivotally connected to the frame to rotate about a control link axis, and a second control arm pivotally connected to the frame to rotate about the control link axis; and a tension link connecting the control link to the roller, the tension link comprising a first tension link extending from the first roller end to the first control arm at a first connection location offset from the control link pivot axis, and a second tension link extending from the second roller end to the second control arm at a second connection location offset from the control link pivot axis;

wherein the control link is movable about the control link pivot axis between:

a locked position, in which the first connection location and the second connection location are located on a first side of an axis extending from the roller rotation axis to the control link pivot axis and the roller is located relative to the frame to generate a first tension force on the belt, a centered position, in which the first connection location and the second connection location are located along the axis extending from the roller rotation axis to the control link pivot axis and the roller is located relative to the frame to generate a second tension force on the belt, the second tension force being greater than the first tension force, and an unlocked position in which the first connection location and the second connection location are located on a second side of the axis extending from the roller rotation axis to the control link pivot axis, and the roller is located relative to the frame to generate no tension force on the belt or to generate a third tension force on the belt, the third tension force being less than the first tension force.

22. The agricultural combine of claim 21, further comprising a control bar connecting the first control arm to the second control arm.

* * * * *